US012656574B1

(12) United States Patent
Yun et al.

(10) Patent No.: US 12,656,574 B1
(45) Date of Patent: Jun. 16, 2026

(54) LENS ATHERMALIZATION

(71) Applicant: Meta Platforms Technologies, LLC, Menlo Park, CA (US)

(72) Inventors: Zhisheng Yun, Sammamish, WA (US); Amber Sun, Sunnyvale, CA (US); Allen Hsu Te Lun, New Taipei City (TW); Kee Siang Goh, Penang (MY)

(73) Assignee: Meta Platforms Technologies, LLC, Menlo Park, CA (US)

( * ) Notice: Subject to any disclaimer, the term of this patent is extended or adjusted under 35 U.S.C. 154(b) by 495 days.

(21) Appl. No.: 18/166,732

(22) Filed: Feb. 9, 2023

Related U.S. Application Data

(60) Provisional application No. 63/343,140, filed on May 18, 2022.

(51) Int. Cl.
G02B 9/10 (2006.01)
G02B 9/12 (2006.01)
G02B 27/01 (2006.01)

(52) U.S. Cl.
CPC ................. G02B 9/10 (2013.01); G02B 9/12 (2013.01); G02B 27/0172 (2013.01)

(58) Field of Classification Search
None
See application file for complete search history.

(56) References Cited

U.S. PATENT DOCUMENTS

| | | | | |
|---|---|---|---|---|
| 2012/0293704 | A1* | 11/2012 | Sano | G02B 13/18 |
| | | | | 348/E5.025 |
| 2013/0094096 | A1* | 4/2013 | Minefuji | G02B 15/1465 |
| | | | | 359/680 |
| 2015/0168692 | A1* | 6/2015 | Kitahara | G02B 13/0045 |
| | | | | 359/752 |
| 2016/0252707 | A1* | 9/2016 | Emi | G02B 13/006 |
| | | | | 348/148 |
| 2019/0179112 | A1* | 6/2019 | Chen | G02B 9/34 |
| 2019/0235196 | A1* | 8/2019 | Hong | G02B 7/028 |
| 2019/0258035 | A1* | 8/2019 | Kanzaki | G02B 13/006 |
| 2020/0057280 | A1* | 2/2020 | Kosuge | G02B 9/60 |
| 2021/0111319 | A1* | 4/2021 | Lutgen | H10H 20/84 |
| 2022/0121017 | A1* | 4/2022 | Saotome | G02B 9/60 |
| 2022/0317420 | A1* | 10/2022 | Chae | G02B 13/0045 |
| 2022/0382015 | A1* | 12/2022 | Nishimura | G02B 9/34 |
| 2023/0059118 | A1* | 2/2023 | Kim | G02B 13/0045 |

* cited by examiner

*Primary Examiner* — Darryl J Collins
(74) *Attorney, Agent, or Firm* — Greenberg Traurig, LLP

(57) ABSTRACT

A fixed position athermal optical system includes a first lens having a negative refractive power, and a second lens having a positive refractive power, where a temperature coefficient of refractive index for the respective lens materials is configured to mitigate the effect of temperature changes on the operation and performance of the optical system.

19 Claims, 14 Drawing Sheets

Image Side

Object Side

Material Summary

| Key Index | L1 | L19 | L34 | L38 | L48 |
|---|---|---|---|---|---|
| R.I. @589 nm | 1.520 | 1.511 | 1.507 | 1.617 | 1.590 |
| R.I. @940 nm | 1.511 | 1.503 | 1.500 | 1.597 | 1.570 |
| Abbe Number | 49 | 57 | 57 | 26 | 31 |
| dn/dt (ppm/K) | -200 | -100 | -115 | -175 | -100 |
| Thermal Stability (Weight Loss<5% @ °C) | 270 | 350 | 270 | 270 | 310 |

FIG. 2

Field Curvature / F-Tan(Theta) Distortion

| Field | IH | CRA (Chief Ray Angle) |
|---|---|---|
| 0 | 0 | 0 |
| 0.1 | 0.085 | 3.6 |
| 0.2 | 0.17 | 7.3 |
| 0.3 | 0.255 | 11.1 |
| 0.4 | 0.34 | 14.8 |
| 0.5 | 0.425 | 18.5 |
| 0.6 | 0.51 | 22.1 |
| 0.7 | 0.595 | 25.3 |
| 0.8 | 0.68 | 27.8 |
| 0.9 | 0.765 | 29.4 |
| 1 | 0.85 | 29.9 |

Image Side

A

Object Side

530

530b

530a

520

520c

520b

520a

510

510b

510a

500

LENS ATHERMALIZATION

CROSS-REFERENCE TO RELATED APPLICATION

This application claims the benefit of priority under 35 U.S.C. § 119(e) of U.S. Provisional Application No. 63/343, 140, filed May 18, 2022, the contents of which are incorporated herein by reference in their entirety.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 2 illustrates exemplary optical materials and properties for manufacturing a multi-element athermal lens according to various embodiments.

Figure 1:
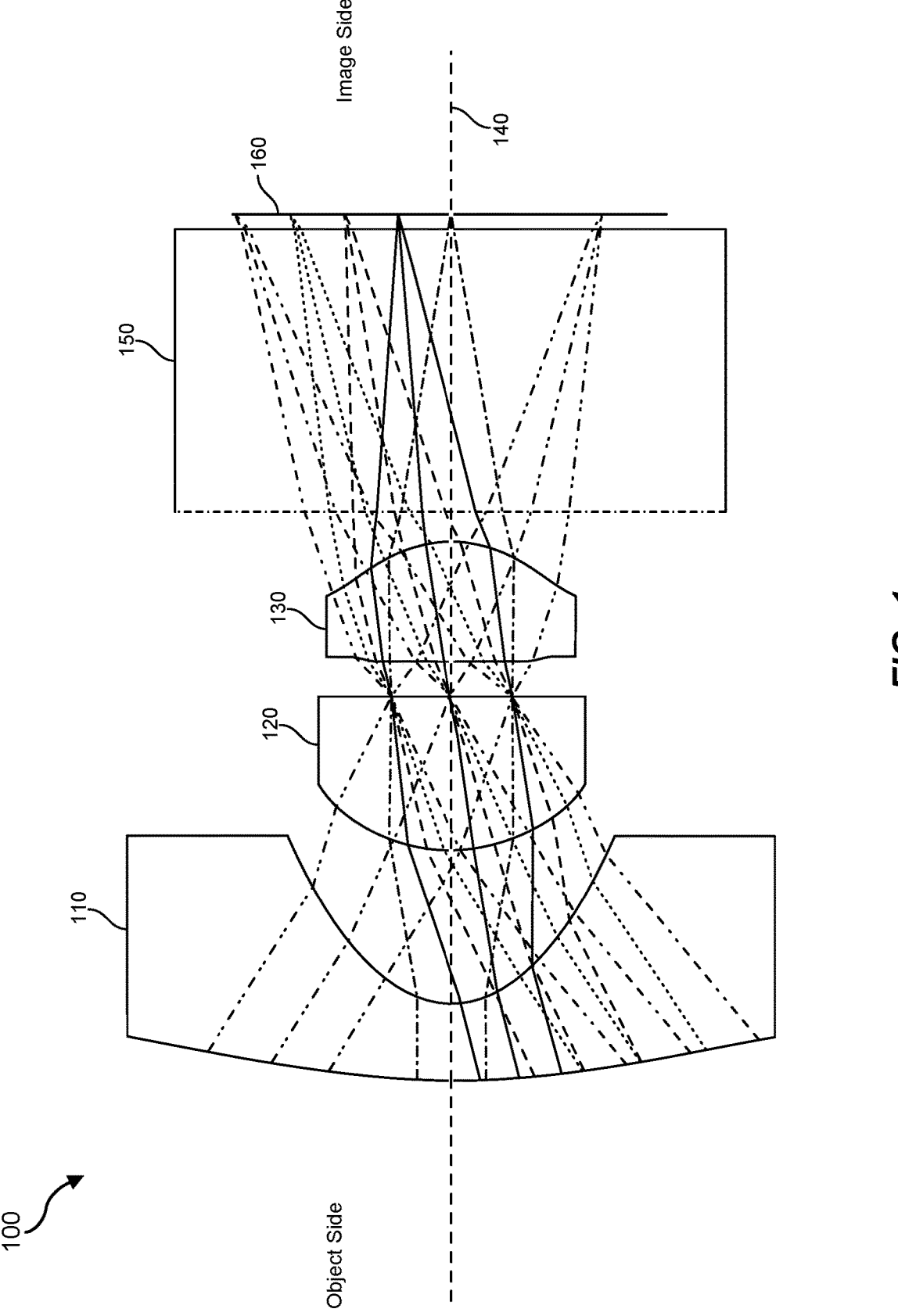
FIG. 1 is a schematic illustration of a wafer-level optics lens design according to some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Polymer and other organic materials may be incorporated into a variety of different optic and electro-optic devices and systems, including passive and active optics and electroactive devices. Lightweight and conformable, one or more polymer/organic solid layers may be incorporated into wearable devices such as smart glasses and are attractive candidates for emerging technologies including virtual reality/augmented reality devices where a comfortable, adjustable form factor is desired.

Virtual reality (VR) and augmented reality (AR) eyewear devices or headsets, for instance, may enable users to experience events, such as interactions with people in a computer-generated simulation of a three-dimensional world or viewing data superimposed on a real-world view. By way of example, superimposing information onto a field of view may be achieved through an optical head-mounted display (OHMD) or by using embedded wireless glasses with a transparent heads-up display (HUD) or augmented reality (AR) overlay. VR/AR eyewear devices and headsets may be used for a variety of purposes. For example, governments may use such devices for military training, medical professionals may use such devices to simulate surgery, and engineers may use such devices as design visualization aids. During use, these and other devices and systems may be exposed to fluctuations in temperature that may adversely affect performance.

Notwithstanding recent developments, it would be advantageous to provide optical systems including lenses and lens architectures that are minimally responsive to changes in temperature, including changes in their thermal environment. The present disclosure is thus generally directed to the design and manufacture of athermal optical systems, and more specifically to lens replication and the formation of thermally insensitive wafer-level optics (WLOs). Particularly for applications prone to temperature fluctuations, the athermalization of polymer and other organic optical components, including lenses and lens architectures, may be valuable in mitigating unwanted optical artifacts and providing a positive user experience.

The expansion and contraction of a material due to a change in its temperature may be determined from its coefficient of thermal expansion ($\alpha$), where a dimensional change ($\Delta L$) in the material may be related to a change in temperature ($\Delta T$) according to $\Delta L = \alpha L \Delta T$. In a related vein, a change in the focal length (f) of a lens with temperature may be related to a change in the refractive index of the lens material with temperature $$\left(\frac{dn}{dT}\right)$$

as well as an attendant dimensional change according to $\Delta f = \beta f \Delta T$, where $\beta$ is the thermo-optic coefficient, which is defined as $$\beta = \alpha - \frac{1}{n-1}\frac{dn}{dT}.$$

In view of the foregoing, it will be appreciated that the impact of a temperature change on the focal length of a lens may be decreased by decreasing the thermo-optic coefficient.

As used herein, the term, "wafer-level optics" may, in connection with some embodiments, include reference to optical devices and systems manufactured on a substrate or wafer using semiconductor processing. In particular embodiments, disclosed are wafer level optical systems including an athermal focus lens assembly having one or more lens elements, e.g., 1, 2, 3, 4, 5, or more lens elements. The terms "athermal" and "athermalization" may describe a lens or other optical device as well as associated methods of manufacture where the lens or optical device has less thermal sensitivity relative to other lenses/optical devices.

An example optical system may include an image sensor and an optical component stack defining a lens. The wafer level optics in such a system may be manufactured using UV polymer replication over a transparent glass substrate. In an example method, a glass substrate and a liquid UV curable resin may be selected having specific optical properties based on design specifications. An array mold may be formed having a plurality of cavities matching the structure of the design intent. The liquid resin may then be dispensed over the mold and into the mold cavities and brought into contact with the glass substrate and cured. The process may be repeated over a second side of the substrate to form an optical element (e.g., an array of lenses).

As disclosed herein, the composition of the UV curable polymer and the attendant variability of the polymer's refractive index with temperature for each lens element of a composite lens may be selected to decrease the overall impact of a temperature change on focal length. In accordance with various embodiments, a decrease in the thermal sensitivity of $\Delta f$ for a lens architecture having two or more optical elements may be achieved by one or more of (a) forming each optical element from a material having a small temperature coefficient of refractive index $$\left(\frac{dn}{dT}\right),$$

(b) assigning a specific optical power to each surface of each optical element, and (c) incorporating a spacer having a large coefficient of thermal expansion (CTE) between an output optical element of the lens architecture and an associated sensor. The optical power for each surface may be assigned by controlling each surface's radius of curvature.

According to exemplary embodiments, suitable lens materials may have a temperature coefficient of refractive index (absolute) ranging from approximately $1 \times 10^{-7}/^\circ$ C. to approximately $2 \times 10^{-4}/^\circ$ C. over a temperature range of $-100^\circ$ C. to $140^\circ$ C. For instance, a polymer lens may have a temperature coefficient of refractive index of $-2 \times 10^{-4}/^\circ$ C., $-1 \times 10^{-6}/^\circ$ C., $1 \times 10^{-7}/^\circ$ C., $1 \times 10^{-6}/^\circ$ C., or $2 \times 10^{-4}/^\circ$ C., including ranges between any of the foregoing values.

In an optical system having a composite lens architecture, at least one of the lens elements may have a negative refractive power (i.e., a diverging lens) and at least one of the lens elements may have a positive refractive power (i.e., a converging lens). In various embodiments, the optical power of each lens may be controlled, where the measured optical power is equal to the reciprocal of the focal length in units of diopter (1 diopter=$m^{-1}$). According to some embodiments, a diverging lens element and a converging lens element of a composite lens may each be formed by using materials having a small temperature coefficient of refractive index $$\left(\frac{dn}{dT}\right).$$

In one example optical system, a diverging lens element may be formed from a polymer composition characterized by a negative temperature coefficient of refractive index, and a converging lens element may be formed from a polymer composition characterized by a positive temperature coefficient of refractive index. In such an example optical system, the temperature coefficient of refractive index for the diverging lens may range from approximately $-1 \times 10^{-6}/^\circ$ C. to approximately $-2 \times 10^{-4}/^\circ$ C. and the temperature coefficient of refractive index for the converging lens may range from approximately $1 \times 10^{-7}/^\circ$ C. to approximately $2 \times 10^{-4}/^\circ$ C.

In a further example optical system, a diverging lens element and a converging lens element of a composite lens may be formed from polymer compositions characterized by a temperature coefficient of refractive index $$\left(\frac{dn}{dT}\right),$$

where $$\left(\frac{dn}{dT}\right) < 0$$

for both the diverging lens element and the converging lens element. By way of example, the temperature coefficient of refractive index for the diverging lens may range from approximately $-1 \times 10^{-6}/^\circ$ C. to $-2 \times 10^{-4}/^\circ$ C. and the temperature coefficient of refractive index for the converging lens may range from approximately $-1 \times 10^{-6}/^\circ$ C. to $-2 \times 10^{-4}/^\circ$ C. In such a system, the absolute value of the temperature coefficient of refractive index for the diverging lens element may be greater than the absolute value of the temperature coefficient of refractive index for the converging lens element.

In a still further example optical system, a diverging lens element and a converging lens element of a composite lens may be formed from polymer compositions characterized by a temperature coefficient of refractive index $$\left(\frac{dn}{dT}\right),$$

where $$\left(\frac{dn}{dT}\right) > 0$$

for both the diverging lens element and the converging lens element. By way of example, the temperature coefficient of refractive index for the diverging lens may range from approximately $1 \times 10^{-7}/^\circ$ C. to $2 \times 10^{-4}/^\circ$ C. and the temperature coefficient of refractive index for the converging lens may range from approximately $1 \times 10^{-7}/^\circ$ C. to $2 \times 10^{-4}/^\circ$ C. In such a system, the temperature coefficient of refractive index for the diverging lens element may be less than the temperature coefficient of refractive index for the converging lens element.

An optical system is configured to mitigate the impact of local temperature fluctuations ($\Delta T$) on system performance. Although the focal length (and focal power) of a lens system may be influenced by changes in temperature, which may be described in terms of the coefficient of thermal expansion (CTE) and temperature coefficient of refractive index $$\left(\frac{dn}{dT}\right)$$

for the lens material, individual lens elements in a composite lens may be structured to provide an athermal optical system.

According to particular embodiments, a composite lens includes a lens element having a negative refractive power (diverging lens) and a lens element having a positive refractive power (converging lens), where the temperature coefficient of refractive index for the respective lens elements may be selected to moderate the effects of temperature on the operation of the composite lens. In conjunction with the foregoing, an athermal optical system may be formed by selecting a lens material having a small value of $$\left(\frac{dn}{dT}\right),$$

and by controlling the radius of curvature of each lens element. An athermal optical system may be formed via a lens replication process using a wafer-level optics paradigm.

Although lenses formed from various organic or inorganic materials are contemplated, example organic lens compositions may include polyacrylates (e.g., polymethylmethacrylate) and polycarbonates including poly(allyl diglycol carbonate). Example inorganic lens compositions may include quartz, silicates, and borosilicates, such as Crown glass.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-7, detailed descriptions of methods for optical system manufacture and associated athermal lens architectures. The discussion associated with FIGS. 1 and 2 includes a description of methods of forming an athermal lens and related athermal lens designs and lens materials. The discussion associated with FIGS. 3-5 includes a description of example athermal lens structures and associated characterization data. The discussion associated with FIGS. 6 and 7 relates to exemplary virtual reality and augmented reality devices that may include one or more optical elements as disclosed herein.

Referring to FIG. 1, shown is a schematic illustration of an example optical system. Optical system 100 may include at least a double composite lens having an in-line arrangement of a diverging lens 110, a first converging lens 120, and a second converging lens 130 positioned in a like manner with respect to optical axis 140. Lens elements including lenses 110, 120, 130 may be manufactured using one or more WLO replication processes. Optical system 100 may additionally include cover glass 150 and a sensor 160.

Cover glass 150 may include a layer of optical glass, for example, and sensor 160 may include a suitable digital device including a multi-dimensional array of sensors, pixels, and the like. Example devices may include a complementary metal-oxide semiconductor (CMOS) array, or a charge-coupled device (CCD) array, etc.

According to some embodiments, one or more of lenses 110, 120, 130 may be a diverging lens or a converging lens and may be accordingly configured to collectively decrease the thermal sensitivity of the optical system 100.

Referring to FIG. 2, the temperature response of the focal length change (Δf) for a lens may be represented as $$\Delta f = f_0 \Delta T \left( \propto_{lens} - \frac{\frac{dn_T}{dT}}{n_0 - 1} \right),$$

where ($f_0$) is the initial focal length of the lens and (ΔT) is the change in temperature. As will be appreciated, small values for the change in the refractive index with temperature $$\left(\frac{dn_T}{dT}\right)$$

may contribute to decreasing Δf. Moreover, the coefficient of thermal expansion for the lens ($\propto_{lens}$), the temperature coefficient of refractive index of the lens $$\left(\frac{dn_T}{dT}\right),$$

and the initial refractive index of the lens material (no) may be independently selected to decrease the value of the parenthetical term, i.e., $$\left( \propto_{lens} - \frac{\frac{dn_T}{dT}}{n_0 - 1} \right),$$

which will accordingly decrease the value of Δf.

According to some embodiments, such as for a composite lens optical system (e.g., optical system 100 and lenses 110, 120, 130), the overall focal length change of the system may be represented as the sum or aggregate of the focal length change for each individual lens. In the example of a triple composite lens, such as in optical system 100, $\Delta f \sim \Delta f_{110} + \Delta f_{120} + \Delta f_{130}$. Applicants have shown that the focal length change for an optical system having a composite lens architecture may be decreased or even minimized by selecting a lens configuration and lens material independently for each lens element. In some embodiments, the optical power of a lens may be similarly controlled, where optical power of a lens, measured in Diopters, is the reciprocal of its focal length.

Figure 3:
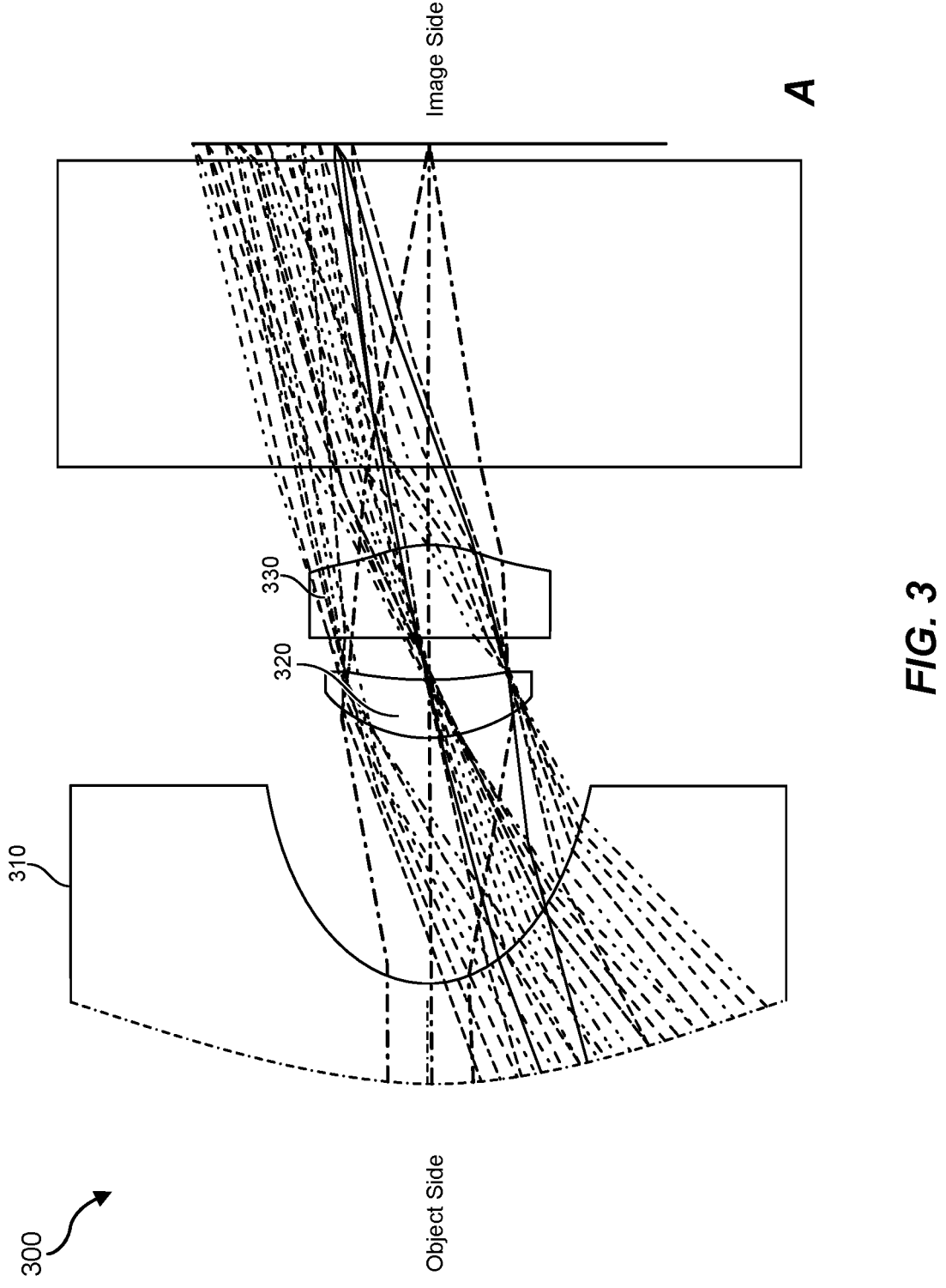
FIGS. 3A-3C show an athermal optical system and related characterization data according to some embodiments.
Figure 3:
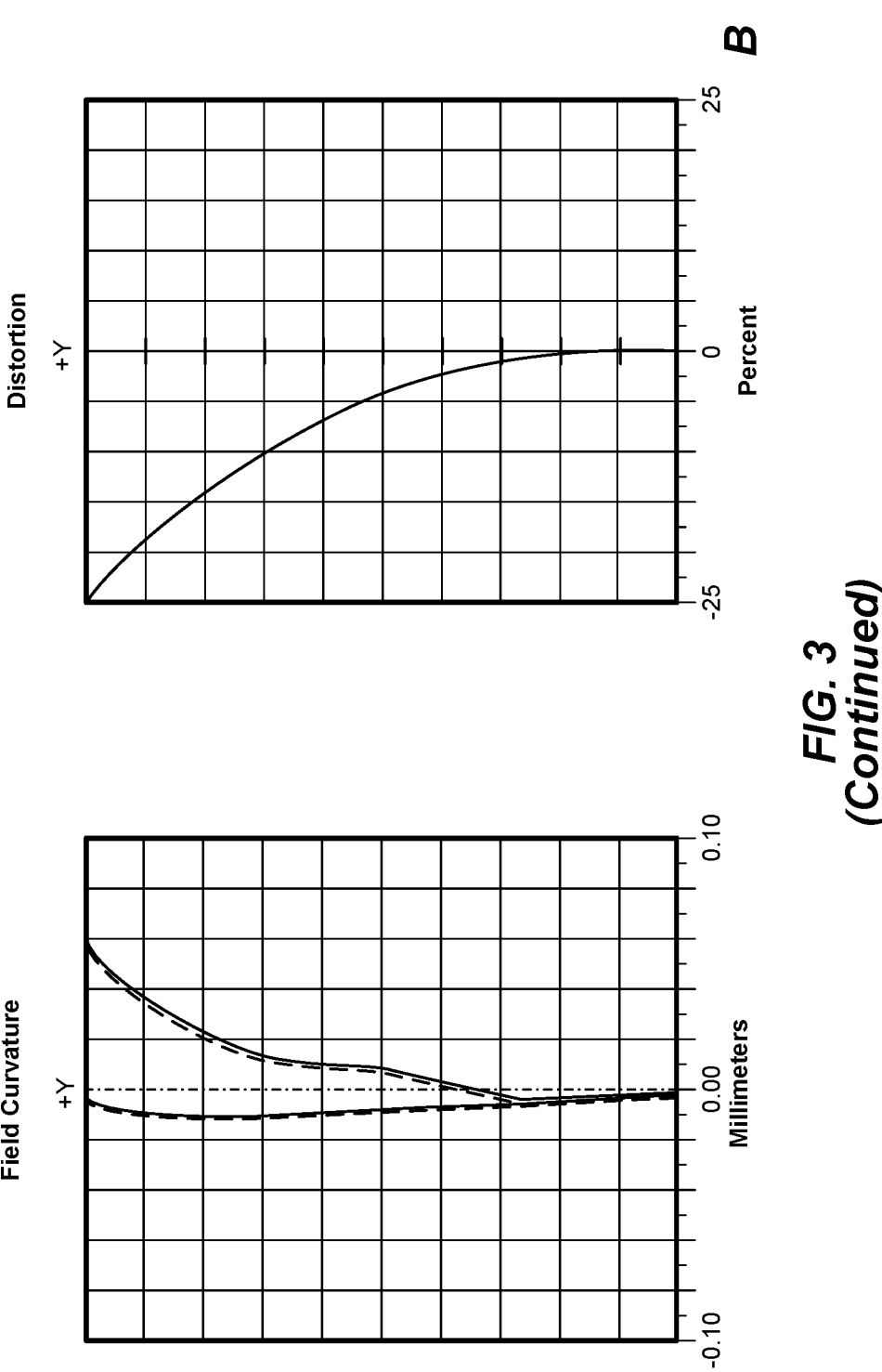
Figure 3:
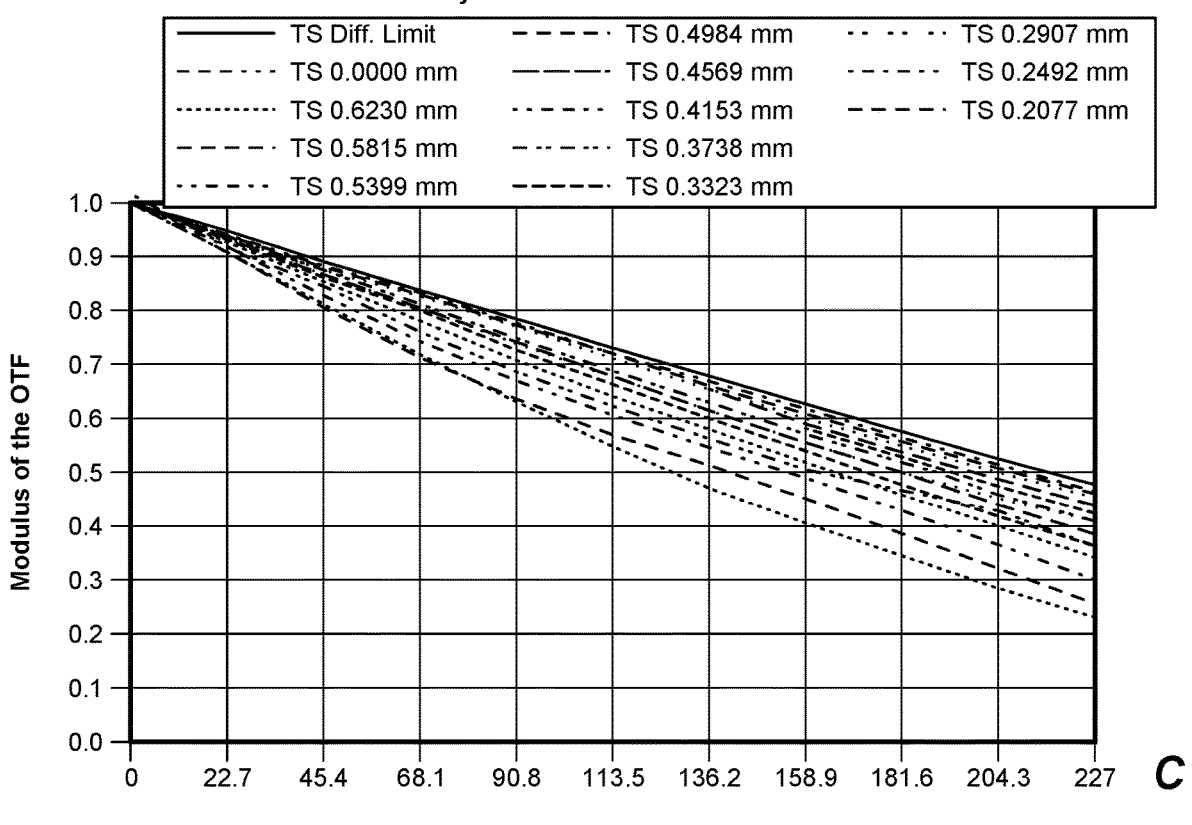
Figure 4:
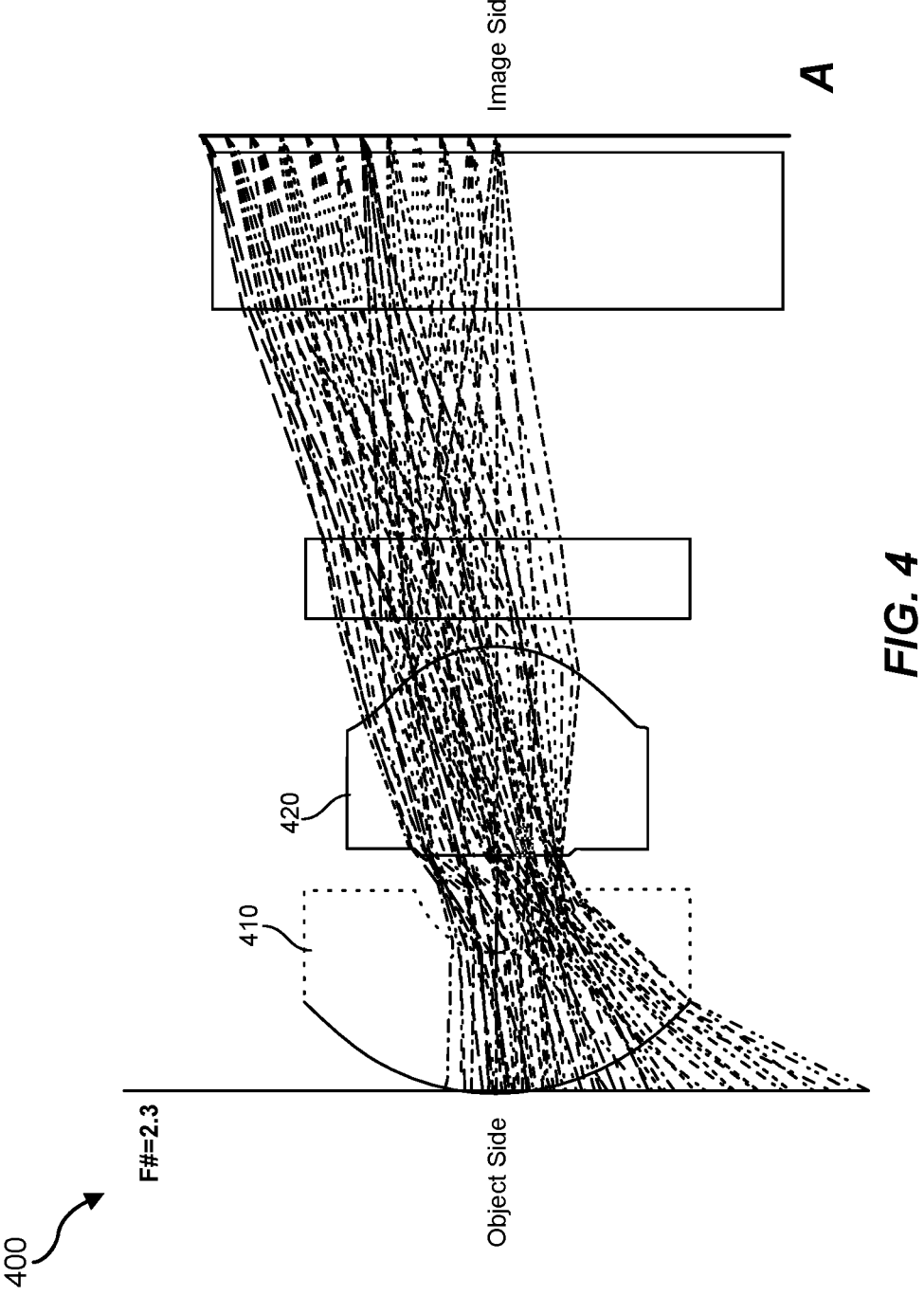
FIGS. 4A-4D show an athermal optical system and related characterization data according to further embodiments.
Figure 4:
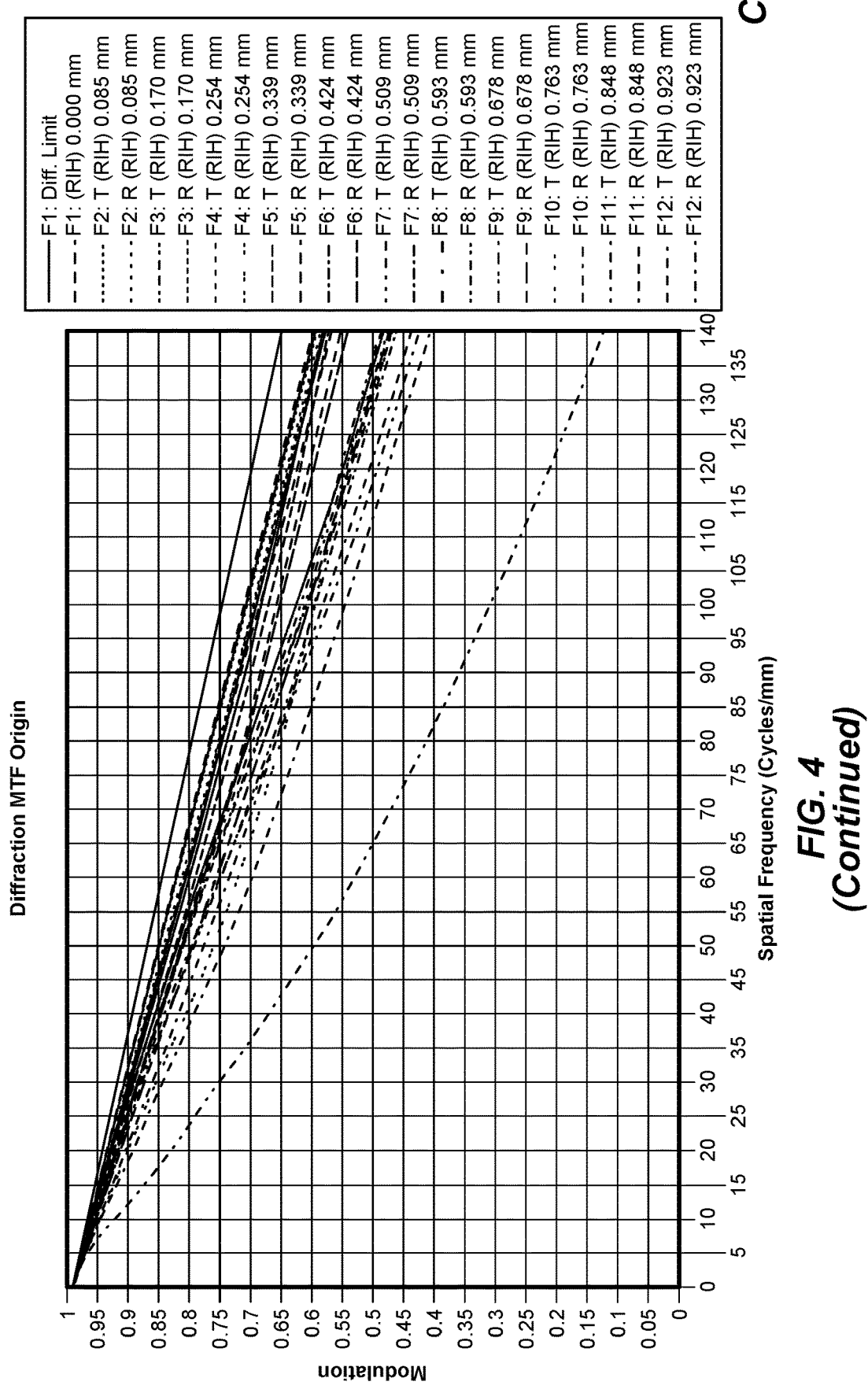
Figure 4:
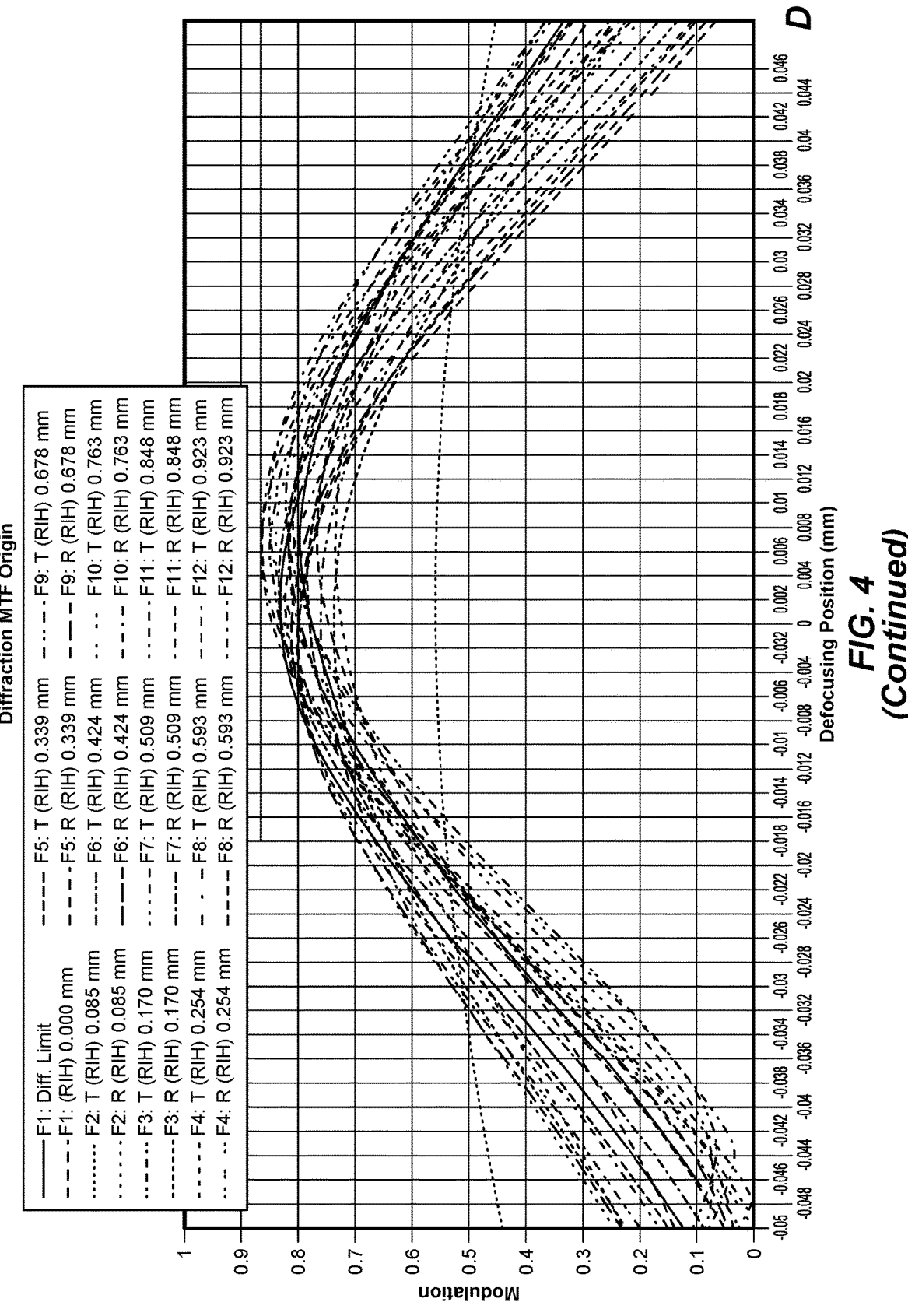
Figure 5:
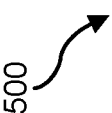
FIGS. 5A-5D show an athermal optical system and related characterization data according to still further embodiments.
Figure 5:
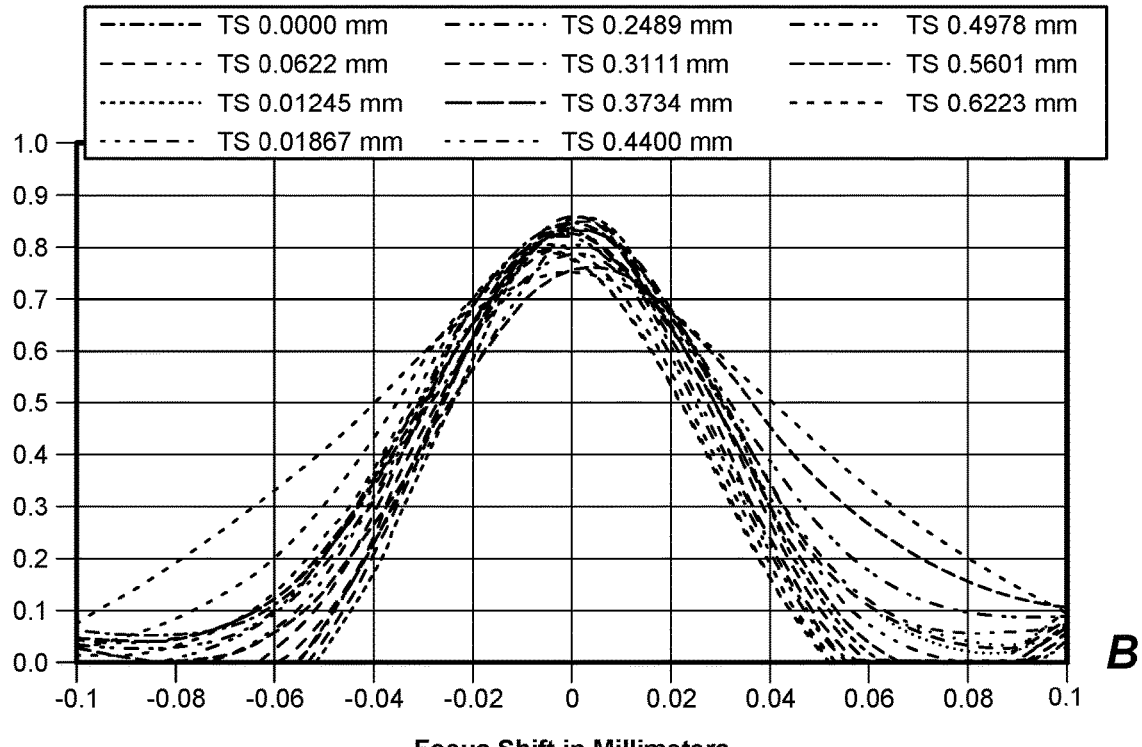
Figure 5:
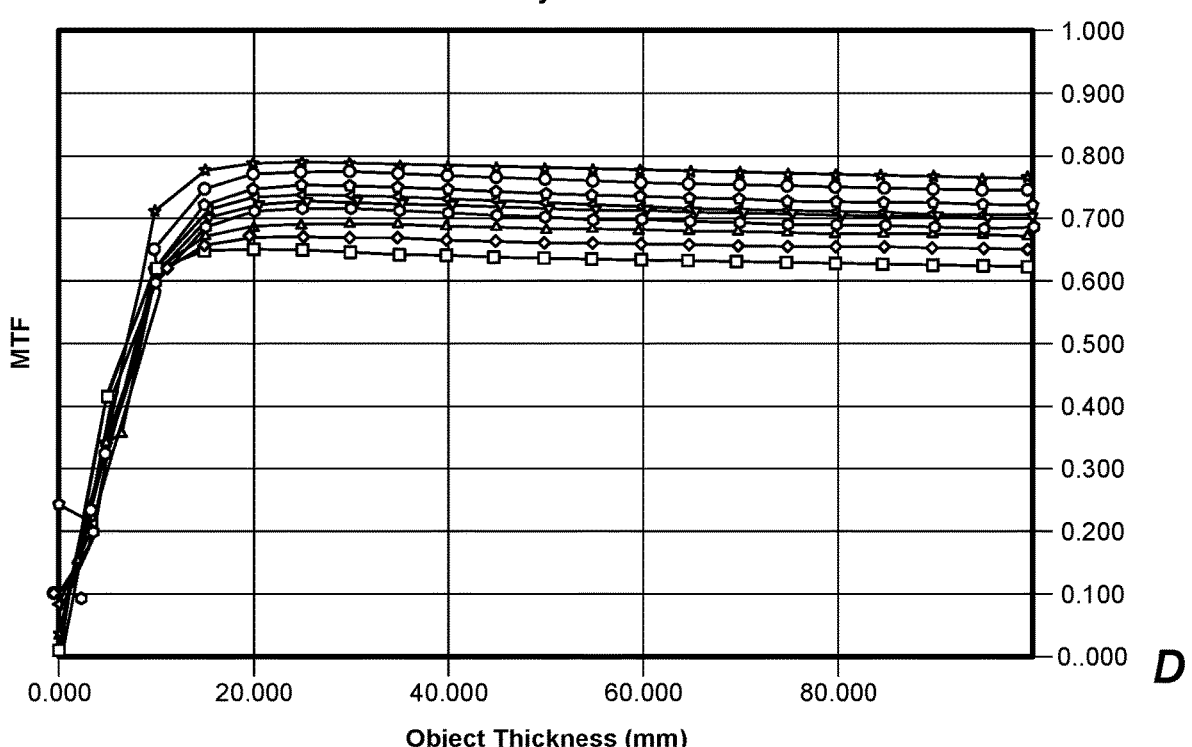

Referring to FIGS. 3-5, illustrated in accordance with various embodiments are example optical systems including athermal lens structures and associated characterization data. FIG. 3A is a block diagram of an example optical system 300 including a first diverging lens 310, a second diverging lens 320, and a converging lens 330. Shown in FIG. 3B are plots of field curvature and distortion for optical system 300. FIG. 3C shows data for a modulation transfer function (MTF) response, including polychromatic diffraction.

Referring to FIG. 4A, shown is a block diagram of a further example optical system. Optical system 400 includes a diverging lens 410 and a converging lens 420. FIGS. 4B-4D provide characterization and performance data for optical system 400.

FIG. 5A depicts a block diagram of a still further optical system. Optical system 500 includes an arrangement of lens 510, lens 520, and lens 530, where each lens includes plural optical elements 510a and 510b, 520a, 520b, and 520c, and 530a and 530b, respectively. FIGS. 5B-5D provide characterization and performance data for optical system 500.

EXAMPLE EMBODIMENTS

Example 1: An optical system includes a first lens having a negative refractive power and a negative temperature coefficient of refractive index, and a second lens having a positive refractive power and a positive temperature coefficient of refractive index.

Example 2: The optical system of Example 1, where the first lens is located proximate to an object side of the optical system and the second lens is located proximate to an image side of the optical system.

Example 3: The optical system of any of Examples 1 and 2, where the first lens and the second lens each include a UV cured polymer.

Example 4: The optical system of any of Examples 1-3, where the first lens and the second lens each include a polymer selected from polyacrylate, polycarbonate, and poly(allyl diglycol carbonate).

Example 5: The optical system of any of Examples 1-4, further including a third lens having a positive refractive power located between the first lens and the second lens.

Example 6: The optical system of any of Examples 1-4, further including a third lens having a negative refractive power located between the first lens and the second lens.

Example 7: An optical system includes a first lens having a negative refractive power and a negative temperature coefficient of refractive index, and a second lens having a positive refractive power and a negative temperature coefficient of refractive index, where the absolute value of the temperature coefficient of refractive index of the first lens is greater than the absolute value of the temperature coefficient of refractive index of the second lens.

Example 8: The optical system of Example 7, where the first lens is located proximate to an object side of the optical system and the second lens is located proximate to an image side of the optical system.

Example 9: The optical system of any of Examples 7 and 8, where the first lens and the second lens each include a UV cured polymer.

Example 10: The optical system of any of Examples 7-9, where the first lens and the second lens each include a polymer selected from polyacrylate, polycarbonate, and poly(allyl diglycol carbonate).

Example 11: The optical system of any of Examples 7-10, further including a third lens having a positive refractive power located between the first lens and the second lens.

Example 12: The optical system of any of Examples 7-10, further including a third lens having a negative refractive power located between the first lens and the second lens.

Example 13: An artificial reality headset including the optical system of any of Examples 7-12.

Example 14: An optical system includes a first lens having a negative refractive power and a positive temperature coefficient of refractive index, and a second lens having a positive refractive power and a positive temperature coefficient of refractive index, where the temperature coefficient of refractive index of the first lens is less than the temperature coefficient of refractive index of the second lens.

Example 15: The optical system of Example 14, where the first lens is located proximate to an object side of the optical system and the second lens is located proximate to an image side of the optical system.

Example 16: The optical system of any of Examples 14 and 15, where the first lens and the second lens each include a UV cured polymer.

Example 17: The optical system of any of Examples 14-16, where the first lens and the second lens each include a polymer selected from polyacrylate, polycarbonate, and poly(allyl diglycol carbonate).

Example 18: The optical system of any of Examples 14-17, further including a third lens having a positive refractive power located between the first lens and the second lens.

Example 19: The optical system of any of Examples 14-17, further including a third lens having a negative refractive power located between the first lens and the second lens.

Example 20: An artificial reality headset including the optical system of any of Examples 14-19.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (e.g., augmented-reality system 600 in FIG. 6) or that visually immerses a user in an artificial reality (e.g., virtual-reality system 700 in FIG. 7). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 6:
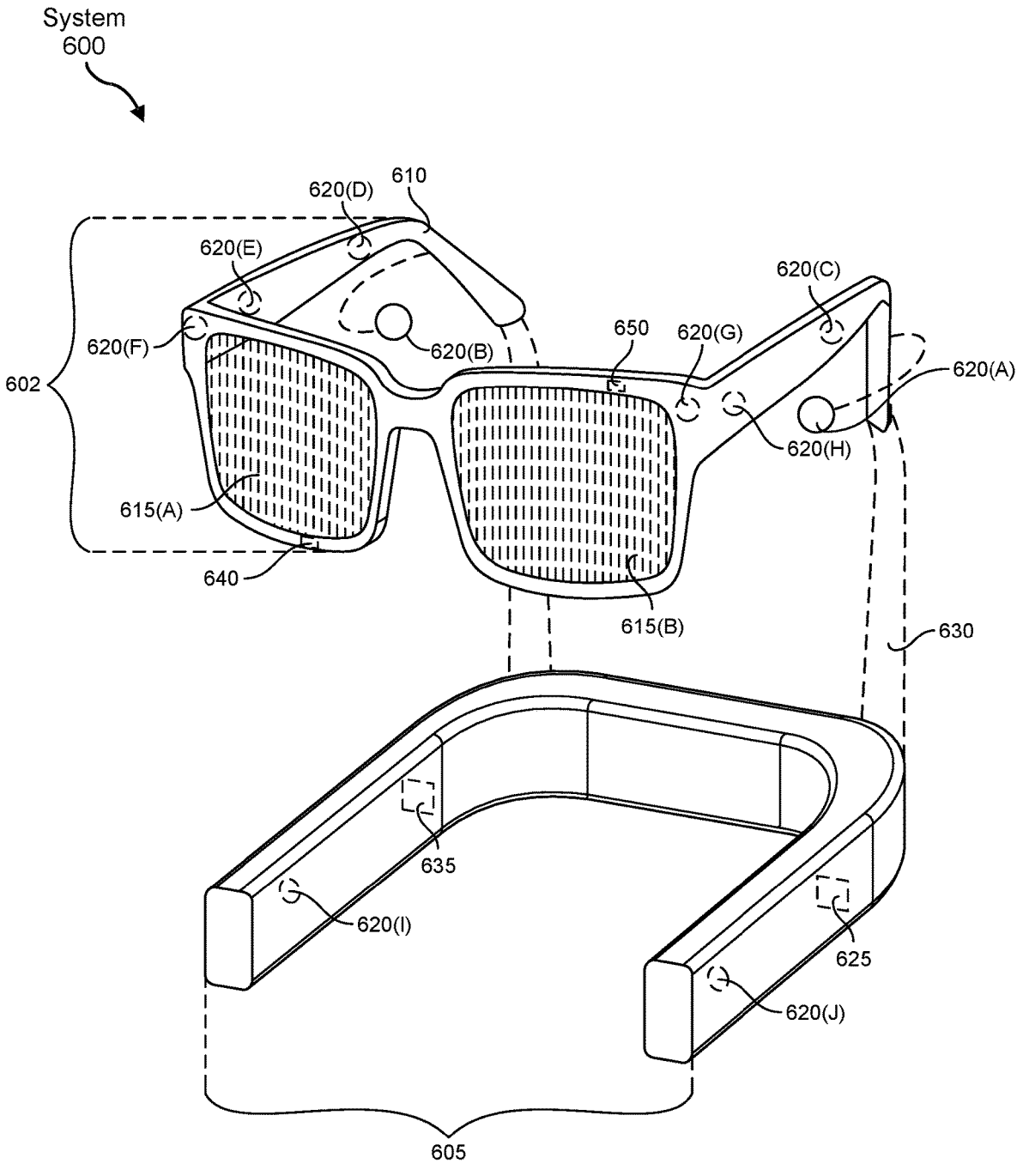
FIG. 6 is an illustration of exemplary augmented-reality glasses that may be used in connection with embodiments of this disclosure.
Figure 7:
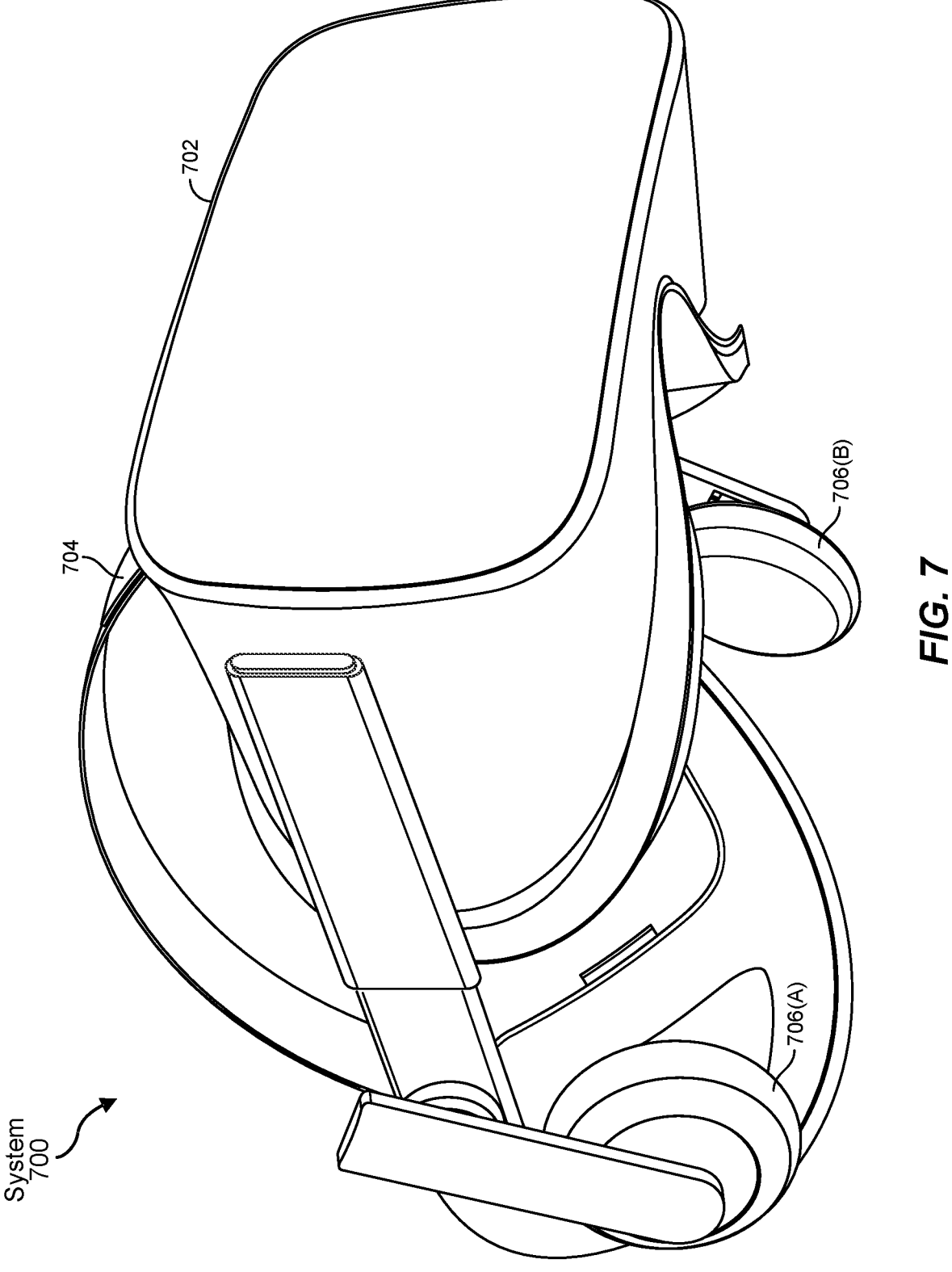
FIG. 7 is an illustration of an exemplary virtual-reality headset that may be used in connection with embodiments of this disclosure.

Turning to FIG. 6, augmented-reality system 600 may include an eyewear device 602 with a frame 610 configured to hold a left display device 615(A) and a right display device 615(B) in front of a user's eyes. Display devices 615(A) and 615(B) may act together or independently to present an image or series of images to a user. While augmented-reality system 600 includes two displays, embodiments of this disclosure may be implemented in augmented-reality systems with a single NED or more than two NEDs.

In some embodiments, augmented-reality system 600 may include one or more sensors, such as sensor 640. Sensor 640 may generate measurement signals in response to motion of augmented-reality system 600 and may be located on substantially any portion of frame 610. Sensor 640 may represent a position sensor, an inertial measurement unit (IMU), a depth camera assembly, a structured light emitter and/or detector, or any combination thereof. In some embodiments, augmented-reality system 600 may or may not include sensor 640 or may include more than one sensor. In embodiments in which sensor 640 includes an IMU, the IMU may generate calibration data based on measurement signals from sensor 640. Examples of sensor 640 may include, without limitation, accelerometers, gyroscopes, magnetometers, other suitable types of sensors that detect motion, sensors used for error correction of the IMU, or some combination thereof.

Augmented-reality system 600 may also include a microphone array with a plurality of acoustic transducers 620(A)-620(J), referred to collectively as acoustic transducers 620. Acoustic transducers 620 may be transducers that detect air pressure variations induced by sound waves. Each acoustic transducer 620 may be configured to detect sound and convert the detected sound into an electronic format (e.g., an analog or digital format). The microphone array in FIG. 6 may include, for example, ten acoustic transducers: 620(A) and 620(B), which may be designed to be placed inside a corresponding ear of the user, acoustic transducers 620(C), 620(D), 620(E), 620(F), 620(G), and 620(H), which may be positioned at various locations on frame 610, and/or acoustic transducers 620(I) and 620(J), which may be positioned on a corresponding neckband 605.

In some embodiments, one or more of acoustic transducers 620(A)-(F) may be used as output transducers (e.g., speakers). For example, acoustic transducers 620(A) and/or 620(B) may be earbuds or any other suitable type of headphone or speaker.

The configuration of acoustic transducers 620 of the microphone array may vary. While augmented-reality system 600 is shown in FIG. 6 as having ten acoustic transducers 620, the number of acoustic transducers 620 may be greater or less than ten. In some embodiments, using higher numbers of acoustic transducers 620 may increase the amount of audio information collected and/or the sensitivity and accuracy of the audio information. In contrast, using a lower number of acoustic transducers 620 may decrease the computing power required by an associated controller 650 to process the collected audio information. In addition, the position of each acoustic transducer 620 of the microphone array may vary. For example, the position of an acoustic transducer 620 may include a defined position on the user, a defined coordinate on frame 610, an orientation associated with each acoustic transducer 620, or some combination thereof.

Acoustic transducers 620(A) and 620(B) may be positioned on different parts of the user's ear, such as behind the pinna, behind the tragus, and/or within the auricle or fossa. Or, there may be additional acoustic transducers 620 on or surrounding the ear in addition to acoustic transducers 620 inside the ear canal. Having an acoustic transducer 620 positioned next to an ear canal of a user may enable the microphone array to collect information on how sounds arrive at the ear canal. By positioning at least two of acoustic transducers 620 on either side of a user's head (e.g., as binaural microphones), augmented-reality device 600 may simulate binaural hearing and capture a 3D stereo sound field around about a user's head. In some embodiments, acoustic transducers 620(A) and 620(B) may be connected to augmented-reality system 600 via a wired connection 630, and in other embodiments acoustic transducers 620(A) and 620(B) may be connected to augmented-reality system 600 via a wireless connection (e.g., a Bluetooth connection). In still other embodiments, acoustic transducers 620(A) and 620(B) may not be used at all in conjunction with augmented-reality system 600.

Acoustic transducers 620 on frame 610 may be positioned along the length of the temples, across the bridge, above or below display devices 615(A) and 615(B), or some combination thereof. Acoustic transducers 620 may be oriented such that the microphone array is able to detect sounds in a wide range of directions surrounding the user wearing the augmented-reality system 600. In some embodiments, an optimization process may be performed during manufacturing of augmented-reality system 600 to determine relative positioning of each acoustic transducer 620 in the microphone array.

In some examples, augmented-reality system 600 may include or be connected to an external device (e.g., a paired device), such as neckband 605. Neckband 605 generally represents any type or form of paired device. Thus, the following discussion of neckband 605 may also apply to various other paired devices, such as charging cases, smart watches, smart phones, wrist bands, other wearable devices, hand-held controllers, tablet computers, laptop computers, other external compute devices, etc.

As shown, neckband 605 may be coupled to eyewear device 602 via one or more connectors. The connectors may be wired or wireless and may include electrical and/or non-electrical (e.g., structural) components. In some cases, eyewear device 602 and neckband 605 may operate independently without any wired or wireless connection between them. While FIG. 6 illustrates the components of eyewear device 602 and neckband 605 in example locations on eyewear device 602 and neckband 605, the components may be located elsewhere and/or distributed differently on eyewear device 602 and/or neckband 605. In some embodiments, the components of eyewear device 602 and neckband 605 may be located on one or more additional peripheral devices paired with eyewear device 602, neckband 605, or some combination thereof.

Pairing external devices, such as neckband 605, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 600 may be provided by a paired device or shared between a paired device and an eyewear device, thus reducing the weight, heat profile, and form factor of the eyewear device overall while still retaining desired functionality. For example, neckband 605 may allow components that would otherwise be included on an eyewear device to be included in neckband 605 since users may tolerate a heavier weight load on their shoulders than they would tolerate on their heads. Neckband 605 may also have a larger surface area over which to diffuse and disperse heat to the ambient environment. Thus, neckband 605 may allow for greater battery and computation capacity than might otherwise have been possible on a stand-alone eyewear device. Since weight carried in neckband 605 may be less invasive to a user than weight carried in eyewear device 602, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 605 may be communicatively coupled with eyewear device 602 and/or to other devices. These other devices may provide certain functions (e.g., tracking, localizing, depth mapping, processing, storage, etc.) to augmented-reality system 600. In the embodiment of FIG. 6, neckband 605 may include two acoustic transducers (e.g., 620(I) and 620(J)) that are part of the microphone array (or potentially form their own microphone subarray). Neckband 605 may also include a controller 625 and a power source 635.

Acoustic transducers 620(I) and 620(J) of neckband 605 may be configured to detect sound and convert the detected sound into an electronic format (analog or digital). In the embodiment of FIG. 6, acoustic transducers 620(I) and 620(J) may be positioned on neckband 605, thereby increasing the distance between the neckband acoustic transducers 620(I) and 620(J) and other acoustic transducers 620 positioned on eyewear device 602. In some cases, increasing the distance between acoustic transducers 620 of the microphone array may improve the accuracy of beamforming performed via the microphone array. For example, if a sound is detected by acoustic transducers 620(C) and 620(D) and the distance between acoustic transducers 620(C) and 620 (D) is greater than, e.g., the distance between acoustic transducers 620(D) and 620(E), the determined source location of the detected sound may be more accurate than if the sound had been detected by acoustic transducers 620(D) and 620(E).

Controller 625 of neckband 605 may process information generated by the sensors on neckband 605 and/or augmented-reality system 600. For example, controller 625 may process information from the microphone array that describes sounds detected by the microphone array. For each detected sound, controller 625 may perform a direction-of-arrival (DOA) estimation to estimate a direction from which the detected sound arrived at the microphone array. As the microphone array detects sounds, controller 625 may populate an audio data set with the information. In embodiments in which augmented-reality system 600 includes an inertial measurement unit, controller 625 may compute all inertial and spatial calculations from the IMU located on eyewear device 602. A connector may convey information between augmented-reality system 600 and neckband 605 and between augmented-reality system 600 and controller 625. The information may be in the form of optical data, electrical data, wireless data, or any other transmittable data form. Moving the processing of information generated by augmented-reality system 600 to neckband 605 may reduce weight and heat in eyewear device 602, making it more comfortable to the user.

Power source 635 in neckband 605 may provide power to eyewear device 602 and/or to neckband 605. Power source 635 may include, without limitation, lithium ion batteries, lithium-polymer batteries, primary lithium batteries, alkaline batteries, or any other form of power storage. In some cases, power source 635 may be a wired power source. Including power source 635 on neckband 605 instead of on eyewear device 602 may help better distribute the weight and heat generated by power source 635.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 700 in FIG. 7, that mostly or completely covers a user's field of view. Virtual-reality system 700 may include a front rigid body 702 and a band 704 shaped to fit around a user's head. Virtual-reality system 700 may also include output audio transducers 706(A) and 706(B). Furthermore, while not shown in FIG. 7, front rigid body 702 may include one or more electronic elements, including one or more electronic displays, one or more inertial measurement units (IMUs), one or more tracking emitters or detectors, and/or any other suitable device or system for creating an artificial reality experience.

Artificial-reality systems may include a variety of types of visual feedback mechanisms. For example, display devices in augmented-reality system 600 and/or virtual-reality system 700 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. Artificial-reality systems may include a single display screen for both eyes or may provide a display screen for each eye, which may allow for additional flexibility for varifocal adjustments or for correcting a user's refractive error. Some artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some artificial-reality systems may include one or more projection systems. For example, display devices in augmented-reality system 600 and/or virtual-reality system 700 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

Artificial-reality systems may also include various types of computer vision components and subsystems. For example, augmented-reality system 600 and/or virtual-reality system 700 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

Artificial-reality systems may also include one or more input and/or output audio transducers. In the examples shown in FIG. 7, output audio transducers 706(A) and 706(B) may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

While not shown in FIG. 6, artificial-reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

It will be understood that when an element such as a layer or a region is referred to as being formed on, deposited on, or disposed "on" or "over" another element, it may be located directly on at least a portion of the other element, or one or more intervening elements may also be present. In contrast, when an element is referred to as being "directly on" or "directly over" another element, it may be located on at least a portion of the other element, with no intervening elements present.

As used herein, the term "approximately" in reference to a particular numeric value or range of values may, in certain embodiments, mean and include the stated value as well as all values within 10% of the stated value. Thus, by way of example, reference to the numeric value "50" as "approximately 50" may, in certain embodiments, include values equal to 50±5, i.e., values within the range 45 to 55.

As used herein, the term "substantially" in reference to a given parameter, property, or condition may mean and include to a degree that one of ordinary skill in the art would understand that the given parameter, property, or condition is met with a small degree of variance, such as within acceptable manufacturing tolerances. By way of example, depending on the particular parameter, property, or condition that is substantially met, the parameter, property, or condition may be at least approximately 90% met, at least approximately 95% met, or even at least approximately 99% met.

While various features, elements or steps of particular embodiments may be disclosed using the transitional phrase "comprising," it is to be understood that alternative embodiments, including those that may be described using the transitional phrases "consisting of" or "consisting essentially of," are implied. Thus, for example, implied alternative embodiments to a lens that comprises or includes a UV curable resin include embodiments where a lens consists essentially of a UV curable resin and embodiments where a lens consists of a UV curable resin.

What is claimed is:

1. An optical system comprising:
   a substrate;
   a first lens disposed over a first surface of the substrate having a negative refractive power and a negative temperature coefficient of refractive index ranging from approximately $-1*10^{-6}/°$ C. to $-2*10^{-4}/°$ C.; and
   a second lens disposed over a second surface of the substrate having a positive refractive power and a positive temperature coefficient of refractive index ranging from approximately $1*10^{-7}/°$ C. to $2*10^{-4}/°$ C., wherein the first lens and the second lens each comprise a UV cured polymer and each lens is in contact with the substrate.

2. The optical system of claim 1, wherein the first lens is located proximate to an object side of the optical system and the second lens is located proximate to an image side of the optical system.

3. The optical system of claim 1, wherein the first lens and the second lens each comprise a polymer selected from the group consisting of polyacrylate, polycarbonate, and poly (allyl diglycol carbonate).

4. The optical system of claim 1, further comprising a third lens having a positive refractive power located between the first lens and the second lens.

5. The optical system of claim 1, further comprising a third lens having a negative refractive power located between the first lens and the second lens.

6. The optical system of claim 1, wherein the first lens and second lens form an athermal optical system.

7. The optical system of claim 6, wherein the athermal optical system is formed via a lens replication process.

8. An optical system comprising:

a substrate;

a first lens disposed over a first surface of the substrate having a negative refractive power and a negative temperature coefficient of refractive index ranging from at least $-1*10^{-6}/°$ C. to $-2*10^{-4}/°$ C.; and a second lens disposed over a second surface of the substrate having a positive refractive power and a negative temperature coefficient of refractive index ranging from at least $-1*10^{-7}/°$ C. to $-2*10^{-4}/°$ C., wherein:

the first lens and the second lens each comprise a UV cured polymer and each lens is in contact with the substrate; and an absolute value of the temperature coefficient of refractive index of the first lens is greater than an absolute value of the temperature coefficient of refractive index of the second lens.

9. The optical system of claim 8, wherein the first lens is located proximate to an object side of the optical system and the second lens is located proximate to an image side of the optical system.

10. The optical system of claim 8, wherein the first lens and the second lens each comprise a polymer selected from the group consisting of polyacrylate, polycarbonate, and poly(allyl diglycol carbonate).

11. The optical system of claim 8, further comprising a third lens having a positive refractive power located between the first lens and the second lens.

12. The optical system of claim 8, further comprising a third lens having a negative refractive power located between the first lens and the second lens.

13. An artificial reality headset comprising the optical system of claim 8.

14. An optical system comprising:

a substrate;

a first lens disposed over a first surface of the substrate having a negative refractive power and a positive temperature coefficient of refractive index ranging from at least $1*10^{-6}/°$ C. to $2*10^{-4}/°$ C.; and a second lens disposed over a second surface of the substrate having a positive refractive power and a positive temperature coefficient of refractive index ranging from at least $1*10^{-7}/°$ C. to $2*10^{-4}/°$ C., wherein:

the first lens and the second lens each comprise a UV cured polymer and each lens is in contact with the substrate; and the temperature coefficient of refractive index of the first lens is less than the temperature coefficient of refractive index of the second lens.

15. The optical system of claim 14, wherein the first lens is located proximate to an object side of the optical system and the second lens is located proximate to an image side of the optical system.

16. The optical system of claim 14, wherein the first lens and the second lens each comprise a polymer selected from the group consisting of polyacrylate, polycarbonate, and poly(allyl diglycol carbonate).

17. The optical system of claim 14, further comprising a third lens having a positive refractive power located between the first lens and the second lens.

18. The optical system of claim 14, further comprising a third lens having a negative refractive power located between the first lens and the second lens.

19. An artificial reality headset comprising the optical system of claim 14.

* * * * *